US007130176B2

(12) United States Patent
Daoud et al.

(10) Patent No.: US 7,130,176 B2
(45) Date of Patent: Oct. 31, 2006

(54) PROTECTIVE ENCLOSURES AND RELATED METHODS

(75) Inventors: Bassel H. Daoud, Parsippany, NJ (US); Ivan Pawlenko, Holland, PA (US); Larry Samson, Langhorne, PA (US)

(73) Assignee: Lucent Technologies Inc., Murray Hil, NJ (US)

( * ) Notice: Subject to any disclaimer, the term of this patent is extended or adjusted under 35 U.S.C. 154(b) by 14 days.

(21) Appl. No.: 11/019,515

(22) Filed: Dec. 23, 2004

(65) Prior Publication Data

US 2006/0139853 A1 Jun. 29, 2006

(51) Int. Cl.
*H02H 1/00* (2006.01)

(52) U.S. Cl. ........................................ 361/117; 439/894

(58) Field of Classification Search ................ 439/894; 361/117

See application file for complete search history.

(56) References Cited

U.S. PATENT DOCUMENTS

| | | | | |
|---|---|---|---|---|
| 4,796,159 | A * | 1/1989 | Miksche | 361/832 |
| 6,683,772 | B1 * | 1/2004 | Fowler et al. | 361/117 |
| 2004/0002269 | A1 * | 1/2004 | Jahn | 439/894 |
| 2005/0272319 | A1 * | 12/2005 | Schmidt et al. | 439/894 |

FOREIGN PATENT DOCUMENTS

SU 496614 A * 3/1976

* cited by examiner

*Primary Examiner*—Ronald Leja

(57) ABSTRACT

A protective enclosure includes one or more walls for surrounding an electronic device. At least one of the walls includes energy absorbing protrusions for absorbing the energies, etc., created when, and if, the electronic device unfortunately explodes due to a lightning strike.

23 Claims, 3 Drawing Sheets

PROTECTIVE ENCLOSURES AND RELATED METHODS

BACKGROUND OF THE INVENTION

So-called electronic interface devices are used throughout communication networks to connect an external network with an internal network, for example.

Though these devices may be outdoors or indoors, regardless of their location, these devices, as well as other electronic devices, are subject to electrical surges due to lightning strikes.

In an attempt to absorb the energy created by a lightning strike, such devices may incorporate subcomponents that can protect the device from such large amounts of energy or can otherwise withstand such large amounts of energy. An example of such a subcomponent is a fuse.

Still, if a direct lightning strike or an unusually high-energy indirect lightning strike occurs, existing techniques may fail to provide sufficient protection. If this occurs, the energy may be great enough to cause an electronic device, etc. to explode. Realizing this, electronic devices are typically surrounded by some form of a physical enclosure. If and when an explosion occurs the enclosure traps the force of the explosion, and any pieces of an exploded electronic device, inside the enclosure to prevent injury to persons or property outside the enclosure.

Unfortunately, existing enclosures do not provide an acceptable amount of protection when a direct lightning strike or a high-energy, indirect lightning strike occurs. More particularly, laboratory tests have shown that existing enclosures do not provide an adequate amount of protection when a lightning strike generates a current of 60,000 amps over an 80–20 millisecond time period.

Accordingly, it is desirable to provide for enclosures which can provide protection to persons and property when such lightning strikes occur.

SUMMARY OF THE INVENTION

We have recognized that persons and property may be protected from lightning strikes by providing an enclosure for an electronic device or the like which includes, on an inner surface, one or more energy absorbing protrusions. If and when an explosion occurs, the protrusions absorb much of the force of the explosion. By so absorbing and/or dispersing the explosive forces, the inventive enclosures prevent harm to surrounding persons or property.

The inner surface, which includes the protrusions, may be combined with an outer surface to form a wall ("first wall") of the enclosure.

We have also recognized that added protection may be afforded persons and property by adding a second wall which substantially surrounds the first wall and adding one or more types of an energy absorbing material, such as an epoxy, concrete, sand, or some combination of the three, in between the second wall and the first wall.

A DESCRIPTION OF THE INVENTION, USING EXAMPLES

Figure 1A:
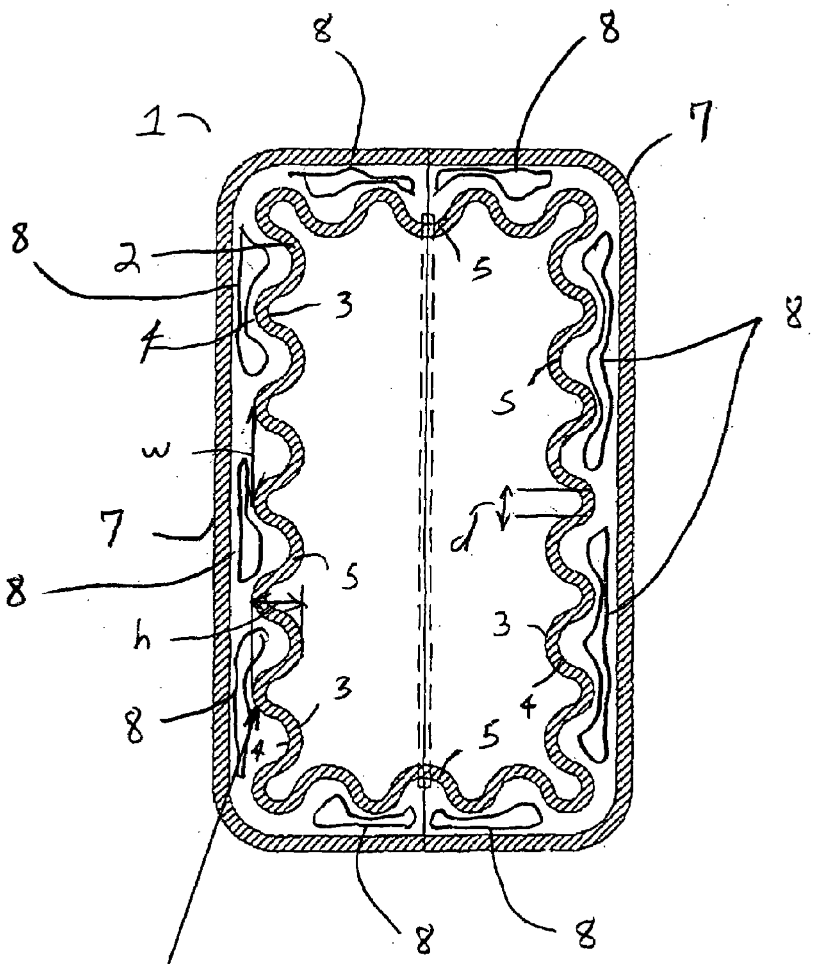
FIGS. 1A–1C depict different views of a protective enclosure in accordance with one exemplary embodiment of the present invention.

Referring now to FIG. 1A, there is shown a cross-sectional side view of an enclosure 1 according to one example of the present invention. The enclosure 1 surrounds a lightning protection device (e.g., fuse) and/or other electronic devices (not shown in FIG. 1) and can be mounted indoors or outdoors.

To reduce the dangers resulting from the explosive forces generated by lightning strikes, the enclosure includes one or more protrusions 5 on an inner surface 3 of enclosure 1.

In one alternative example of the present invention, the protrusions 5 extend inward toward the center of the enclosure 1 which is typically where an electronic device, and therefore the source of an explosion, is centered. When an explosion occurs, the explosive forces impinge on the protrusions 5 and are absorbed, sometimes forcing the protrusions outward.

Though the protrusions 5 in FIG. 1 are shown as rounded, this is merely illustrative. Alternatively, the shape of the protrusions 5 may be more of a rectangular, triangular, or another geometric shape which substantially absorbs and/or disperses explosive energies and/or explosive fragments.

As shown in FIG. 1, enclosures provided by the present invention may comprise a plurality of protrusions 5 each having a height, h, width, w, and being separated by a distance, d.

For illustrative purposes only, the width of each protrusion 5 may be 6 to 8 inches wide, the height may be 3 inches tall, and the distance between protrusions may be ¾ inch. Though not shown in FIG. 1, each of the protrusions may also have a depth of 6–8 inches. It should be understood that these dimensions are for illustrative purposes only and are not meant to limit the possible dimensions of one or more of the protrusions. Similarly, one or more of the protrusions 5 may differ in dimensions from another protrusion 5.

It should also be understood that the number of protrusions used in an enclosure is a design choice. Therefore, the number of protrusions 5 shown in FIG. 1 is not meant to limit the scope of the present invention.

Before going further, it should be understood that the terms absorb and disperse are sometimes used synonymously or interchangeably herein to describe the ability of the inventive enclosures to reduce the damaging effects of lightning strikes.

The inner surface 3 may be blow-molded with an outer surface 4 to form a wall ("first wall"). The inner and outer surfaces need not be made from the same type of material. For example, the inner surface 3 (including protrusions 5) may be made from a fire-retardant material while the outer surface may be made from an ultraviolet (u/v) material, such as a plastic or the like.

Figure 1B:
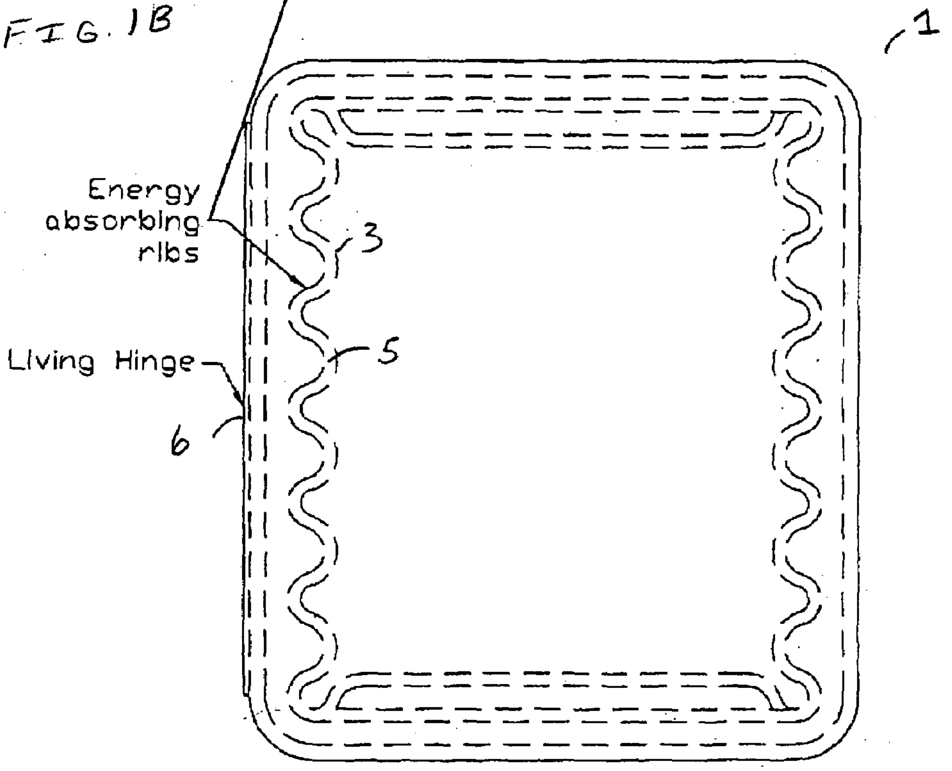
Figure 1C:
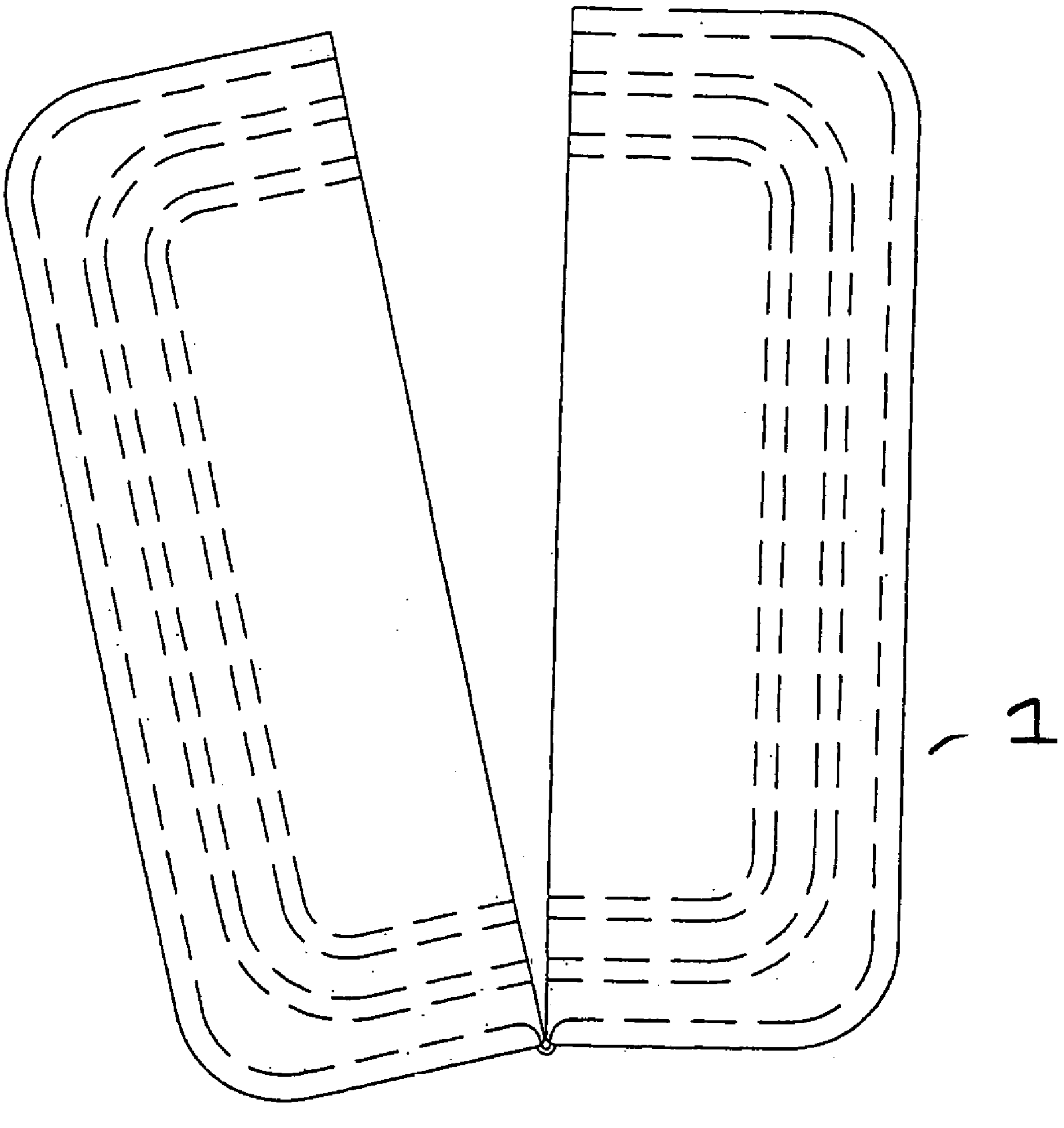

FIG. 1B depicts a cross-sectional top view of the enclosure 1 while FIG. 1C depicts a view of the enclosure 1 in an open position. As shown in FIG. 1B, enclosure 1 may comprise a so-called "living hinge" 6 that permits repeated openings and closings of the enclosure 1.

In addition to a first wall 2, enclosures provided by the present invention may comprise additional walls.

Referring back to FIG. 1A, there is shown a second wall 7. Between the first wall 2 and second wall 7 there may be located one or more types of an energy absorbing material 8, such as an epoxy, concrete, sand or some combination of at least two or more of the above materials. The addition of the energy absorbing material 8 and the second wall 7 further prevents explosive forces and fragments generated by a lightning strike from escaping the enclosure, thus preventing damage to persons and property surrounding the enclosure 1. If desired, this second wall 7 may also include one or more energy absorbing protrusions (not shown in FIG. 1A).

Though FIG. 1A appears to depict the energy-absorbing material 8 in certain areas between walls 2 and 7, it should be understood that the material may substantially fill the space between walls 2 and 7.

In yet another embodiment of the invention, additional walls which substantially surround walls 2 and 7 (not shown in FIG. 1A) may be added to provide additional protection. As before, in between one or more of the walls may be placed one or more types of an energy absorbing material. Again, as before, an additional wall may also include an inner surface that has one or more energy absorbing protrusions formed on its surface.

Backtracking somewhat, the pattern of protrusions shown in the figures may form a step-like pattern for absorbing the explosive energies, etc. generated by a lightning strike. It should-be understood that this pattern is only one of many patterns which may be formed by a plurality of protrusions.

Figure 2:
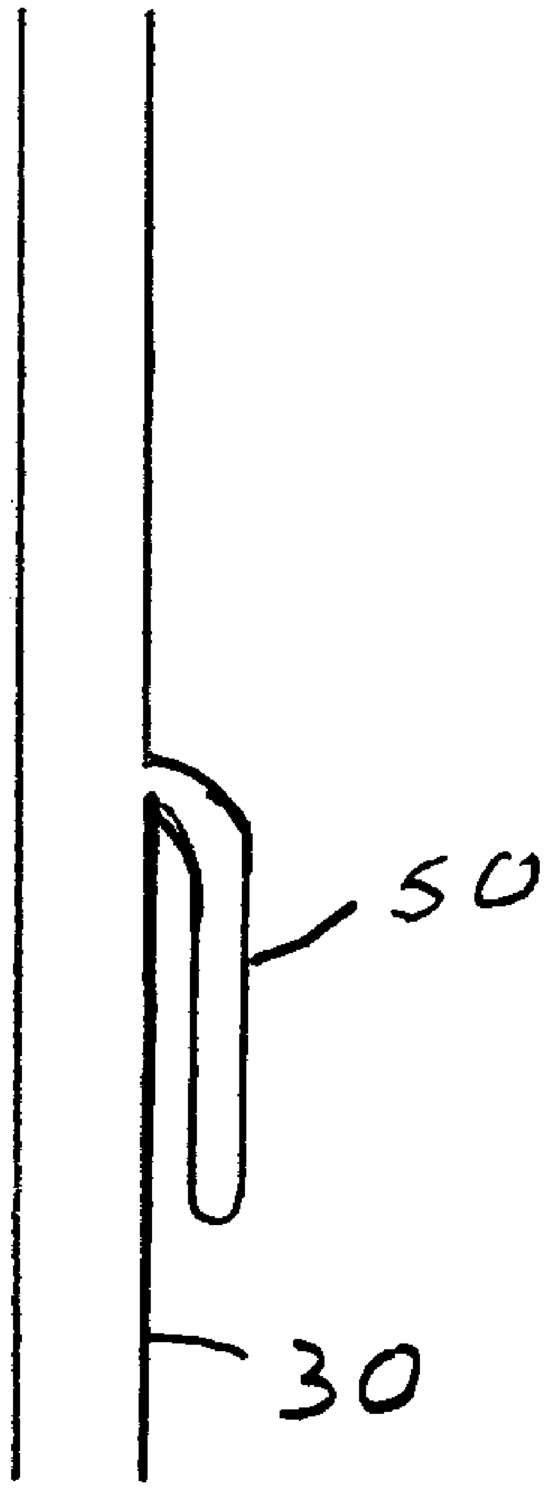
FIG. 2 depicts an orientation of energy absorbing protrusions which may be used in a particular enclosure according to an exemplary embodiment of the present invention.

Though the protrusions shown in the figures are depicted as extending inward toward the center of the enclosure, these protrusions may also be orientated in other directions. For example, a protrusion may be orientated in a more parallel direction to a surface, such as an inner surface. In such an arrangement, the protrusions may be perpendicular to explosive forces. Many variations of the orientation of these protrusions may be designed based on a given application and explosive force. In alternative examples of the present invention, some protrusions may extend equally in one direction as another (e.g., equally inward as well as parallel to a surface) while others may extend more inward than parallel, or more parallel than inward. FIG. 2 depicts an example of a protrusion 50 which extends in more of a parallel direction to a surface 30 than inward.

The above discussion has attempted to set forth some examples of enclosures that provide persons and property protection against explosive forces, etc. resulting from lightning strikes. It should be understood, however, that variations on the above examples may be envisioned and still fall within the scope of the present invention which is determined by the claims which follow.

We claim:

1. A protective enclosure for an electronic device comprising:

an inner surface including one or more energy absorbing protrusions;

an outer surface, wherein the inner and outer surfaces form a first wall;

a second wall substantially surrounding the first wall; and one or more types of energy absorbing material located between the first and second wall.

2. The enclosure as in claim 1 wherein the second wall comprises an inner surface which includes one or more energy absorbing protrusions.

3. The enclosure as in claim 1 wherein one or more of the protrusions form a step-like pattern on the inner surface.

4. The enclosure as in claim 1 wherein one or more of the protrusions extend inward.

5. The enclosure as in claim 1 wherein one or more of the protrusions are orientated substantially parallel to the inner surface.

6. The enclosure as in claim 1 wherein the type of energy absorbing material is an epoxy.

7. The enclosure as in claim 1 wherein the type of energy absorbing material is concrete.

8. The enclosure as in claim 1 wherein the type of energy absorbing material is sand.

9. The enclosure as in claim 1 wherein the type of energy absorbing material is a combination of at least two of an epoxy, concrete and sand.

10. The enclosure as in claim 1 wherein the outer surface comprises a blow-molded, ultraviolet (U/V) material.

11. The enclosure as in claim 10 wherein the U/V material comprises a plastic.

12. The enclosure as in claim 1 wherein the inner surface and protrusions comprise a fire-retardant material.

13. The enclosure as in claim 1 wherein one or more of the protrusions have a width of 6 to 8 inches.

14. The enclosure as in claim 1 wherein one or more of the protrusions have a height of 3 inches.

15. The enclosure as in claim 1 wherein one or more of the protrusions are separated by ¾ of an inch from another protrusion.

16. The enclosure as in claim 1 wherein each of the protrusions is operable to absorb energy resulting from an explosion of internal components.

17. The enclosure as in claim 1 wherein each of the protrusions is operable to absorb energy resulting from an explosion of internal components caused by a lightning strike.

18. A method for forming a protective enclosure for an electronic device comprising:

forming an inner surface including one or more energy absorbing protrusions;

forming an outer surface, wherein the inner and outer surfaces form a first wall;

forming a second wall substantially surrounding the first wall; and placing one or more types of energy absorbing material between the first and second wall.

19. The method as in claim 18 further comprising forming one or more energy absorbing protrusions on an inner surface of the second wall.

20. The method as in claim 18 further comprising forming the one or more protrusions into a step-like pattern on the inner surface.

21. The method as in claim 18 further comprising forming one or more inward extending protrusions.

22. The method as in claim 18 further comprising forming one or more protrusions orientated substantially parallel to the inner surface.

23. The method as in claim 18 wherein each of the protrusions is formed to absorb energy resulting from an explosion of internal components.

* * * * *